April 5, 1932.  J. B. BAXTER  1,852,689
SNAP HOOK
Filed March 27, 1929  3 Sheets-Sheet 1
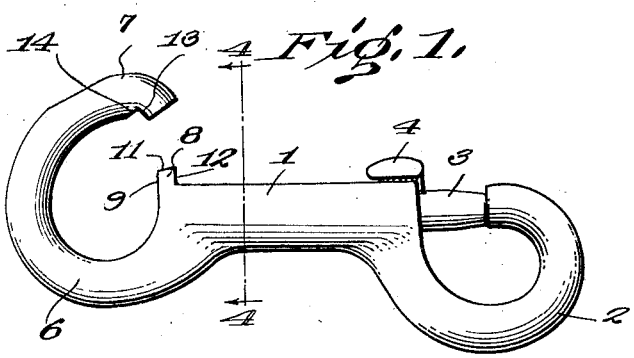
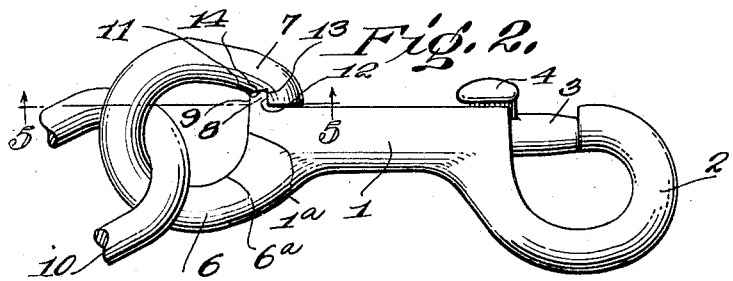
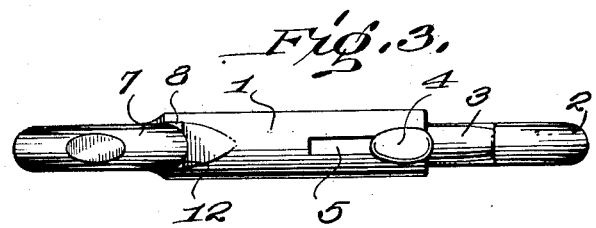
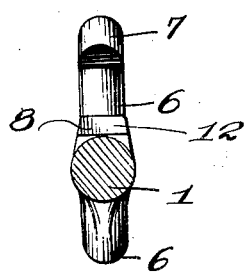
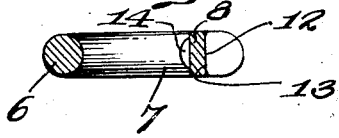
Inventor
John B. Baxter
By Milans & Milans
Attorney April 5, 1932.   J. B. BAXTER   1,852,689
SNAP HOOK
Filed March 27, 1929   3 Sheets-Sheet 2
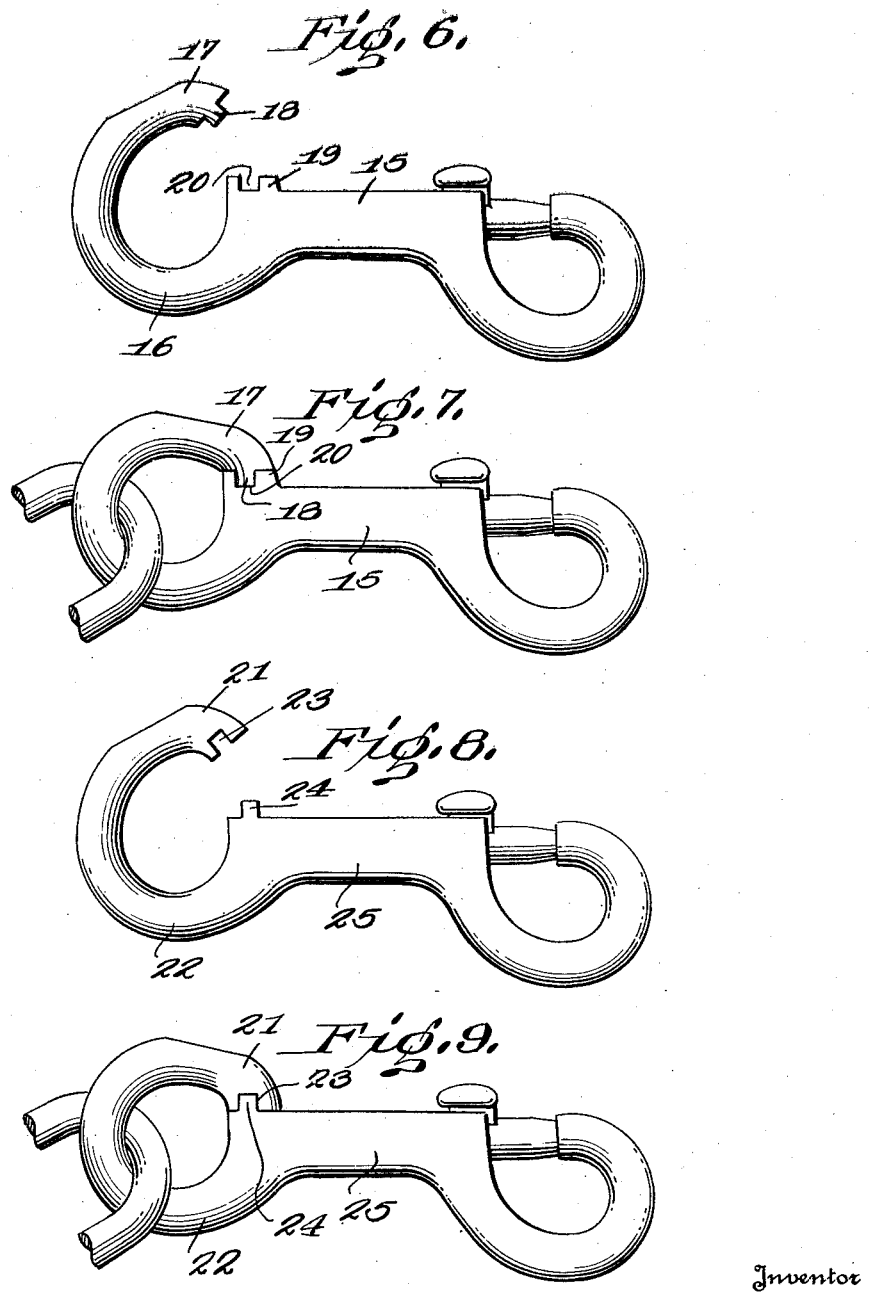

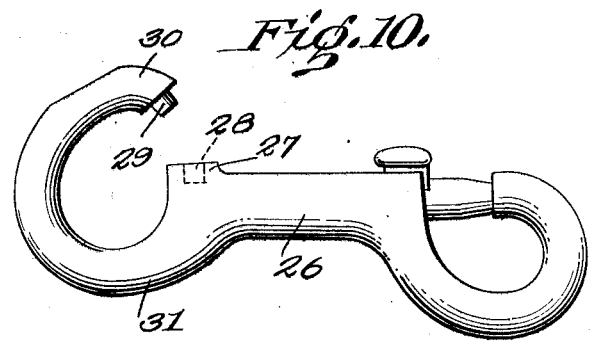
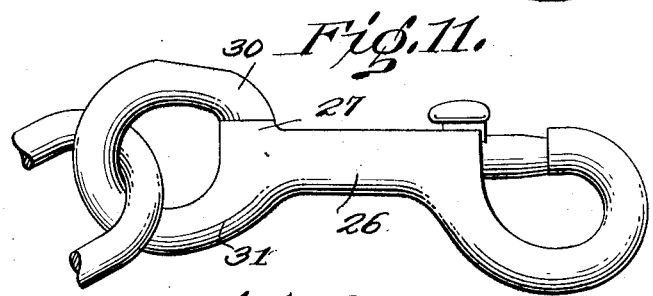
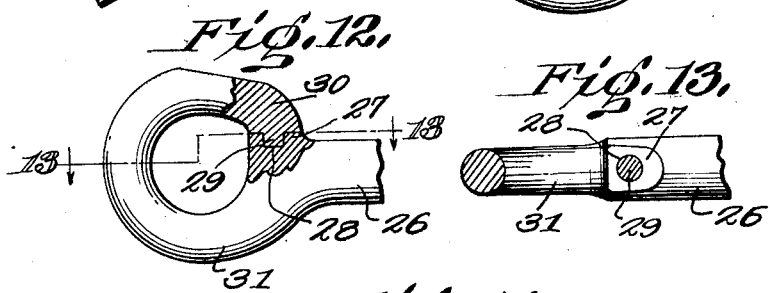
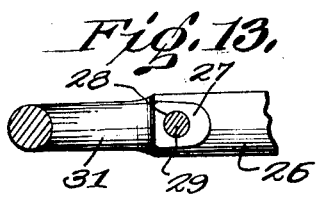
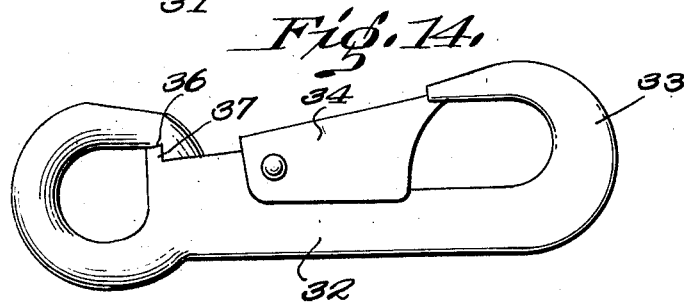

Patented Apr. 5, 1932

1,852,689

UNITED STATES PATENT OFFICE

JOHN B. BAXTER, OF TROY, NEW YORK, ASSIGNOR TO COVERT MANUFACTURING COMPANY, OF WATERVLIET, NEW YORK, A CORPORATION OF NEW YORK

SNAP HOOK

Application filed March 27, 1929. Serial No. 350,279.

This invention relates to improvements in snap hooks and more particularly to devices of this kind that have an attaching eye which is formed integral at one end with the body or shank of the device and is adapted to have its free end portion bent into engagement with the body or shank to close the eye after the engagement with the eye of a link or other part to which the snap hook is to be connected.

An object of the invention is to provide an improved snap hook of the general type referred to; to provide improved means on the body or shank of the snap hook and on the free end portion of the attaching eye that will cooperate in an efficient way to provide a strong interlocking connection of the parts, and which at the same time will be of simple practical construction providing for the closing of the eye and the secure interlocking connection of the parts in a simple, quick, easy manner.

The invention, with other objects and advantages thereof and the particular construction, combination and arrangement of parts comprising the same, will be understood from the hereinafter contained detail description when considered in connection with the accompanying drawings forming part hereof and illustrating embodiments of the invention.

In the drawings:

Figure 1 is a side elevation of a snap hook provided with an attaching eye and interlocking means in accordance with the present invention, the attaching eye being shown open.

Fig. 2 is a similar view, the eye being shown closed.

Fig. 3 is a top plan view with the attaching eye closed.

Fig. 4 is a transverse section on the line 4—4 of Figure 1, looking in the direction of the arrows.

Fig. 5 is a detail longitudinal section on the line 5—5 of Figure 2, looking in the direction of the arrows.

Figs. 6 and 7 are side elevations of a modified construction, the attaching eye being shown opened and closed in the respective views.

Figs. 8 and 9 are side elevations of another modification.

Fig. 10 is a side elevation of a further modified form of the invention, the attaching eye being shown open.

Fig. 11 is a similar view of the construction illustrated in Figure 10 with the attaching eye closed.

Fig. 12 is a fragmentary view, part of the attaching eye being shown in side elevation and part in section.

Fig. 13 is a detail section on the line 13—13 of Figure 12.

Fig. 14 is a side elevation of another modified construction.

The invention comprehends a snap hook having on the rear end of its body or shank at one side thereof a shouldered portion and having a part extending from the opposite side of its rear end bent to form an attaching eye or loop with its free end portion disposed at that side of the body or shank at which the shouldered portion is located and lying in a common plane with the shouldered portion and body, the free end portion of the loop or eye being adapted to interfit with said shouldered portion to hold the same to the body and to be engaged with the shouldered portion by forcing said free end portion inwardly in a direct path in the common plane of the said parts toward said body part or shank.

While several specific embodiments of the invention are illustrated in the drawings, it will of course be understood that changes and modifications may be made in the particular constructions shown, and the invention may be embodied in other forms with various types of snap hook constructions as will appeal to those skilled in the art and falling within the scope of the appended claim without departing from the spirit of the invention.

Referring to a detail description of the particular embodiment of the invention illustrated in Figures 1 to 5 of the drawings, the invention is here shown in connection with a snap hook of the type known as "bolt snaps".

1 designates the body portion or shank of the snap having a hook 2 at its forward end, and 3 is a bolt slidable in a chamber in the body portion 1 and having a thumb piece 4 for operating the same, said thumb piece working in a longitudinal guide slot 5 in the body portion 1.

In accordance with the present invention the body portion or shank 1 has springing from the side thereof at its rear end, a part cast integral therewith and bent around to form an attaching eye or loop 6 with its free end portion 7 disposed at the opposite side of the rear end of the body 1, and said attaching eye or loop with its free end portion 7 lying in a common plane with the body portion or shank 1. The body portion or shank 1 is provided at its rear end at the side thereof opposite that at which the attaching eye or loop 6 joins the same, with a lateral extension 8. The rear face 9 of the lateral extension 8 and the inner face 6$^a$ of the portion of the attaching eye 6 adjoining the back wall 1$^a$ of the body portion or shank 1 are continuous therewith, as shown. The free end portion 7 of the attaching eye 6 is left spaced from the lateral extension 8, as illustrated in Figure 1, a sufficient distance to permit of the engagement therewith of a link 10 or other part with which the snap hook is to be attached, after which the free end portion 7 of the attaching eye 6 is forced into engagement with the lateral extension 8, as illustrated in Figure 2 of the drawings, the attaching eye 6 being closed and the free end portion 7 of the attaching eye fitting against the body portion or shank 1 and the lateral extension 8 in front of and in interlocking relation with the latter.

As shown, the lateral extension 8 has a flat top face 11 and a flat front face 12 disposed at substantially right angles to the longitudinal axis of the body portion or shank 1, and the free end portion 7 of the attaching eye 6 at its inner side is formed with a notched part having flat faces 13, 14, to respectively fit against the flat faces 12 and 11 of the lateral extension 8. The lateral extension 8 is disposed in a common plane with the free end portion 7 of the attaching eye 6, and the construction of said free end portion and the lateral extension 8 are such that said free end portion can be engaged with the lateral extension 8 by forcing the same inwardly toward the body portion or shank 1 in a substantially direct path in the common plane of the parts, from the open position illustrated in Figures 1 and 4.

In the modified construction illustrated in Figures 6 and 7, 15 designates the body portion or shank provided with the attaching eye 16. In this instance, the free end portion 17 of the attaching eye 16 is formed with a rectangular shaped lug or projection 18 at its outer end, and the body portion or shank 1 has a lateral extension 19 which is provided with a transversely extending rectangular shaped recess 20 adapted to receive the projection or lug 18 of the free end portion 17 of the attaching eye 16.

In the modified form of the invention illustrated in Figures 8 and 9, the free end portion 21 of the attaching eye 22 has a transversely recessed outer end 23 to interfit with a rectangular shaped lateral extension or shoulder 24 on the body portion or shank 25.

In the modification illustrated in Figures 10 to 13 of the drawings, the body portion or shank 26 has a lateral extension 27 provided with a socket 28 to receive a cylindrical lug or projection 29 on the end of the free end portion 30 of the attaching eye 31.

The attaching eye structure illustrated in Figure 14 is the same as that shown in Figures 1 to 5 of the drawings except that it is here illustrated in connection with a snap hook of the pivoted tongue type. The snap hook structure proper is one of the well known forms of pivoted snaps comprising a shank 32, a hook 33, and a pivoted tongue 34 to cooperate with the hook 33. 35 designates the attaching eye having its free end portion formed with a notched or recessed part 36, as shown, to interlock with a lateral extension 37 on the body portion or shank 32.

It will be noted that each of the several forms of the invention hereinbefore described provides for a secure interlocking connection of the free end portion of the attaching eye with the body portion or shank, and at the same time the special interlocking means on the free end portion of the attaching eye and the body portion or shank is such as to provide for the closing of the eye and the interlocking connection of the parts by forcing the free end portion of the eye inwardly in a substantially direct path in the common plane of the parts. As will be understood the operation of closing the eye and interlocking the same to the body portion or shank can be effected in a simple, expeditious manner by hammering down the free end portion of the attaching eye. The particular interlocking means on the free end portion of the attaching eye and on the body portion or shank is of a simple practical nature, resulting in a strong dependable construction that can be produced at low cost.

What I claim is:

A hook comprising a body part having at its inner end portion at one side thereof a shoulder, and having a part extending from its inner end portion at the side thereof opposite the side at which said shoulder is located, said part being bent to form a loop or eye with its free end portion disposed at that side of the body part at which said shoulder is located and having its greatest cross sectional dimension lying in a common plane therewith and with the body part, the free end portion of said loop part being formed to fit in front of and to interlock against said shoulder and to be engaged therewith by forcing said free end portion inwardly in the common plane of said parts toward said body part.

In testimony whereof I hereunto affix my signature.

JOHN B. BAXTER.